(12) United States Patent
Yao

(10) Patent No.: US 10,444,859 B2
(45) Date of Patent: Oct. 15, 2019

(54) DIGITAL STYLUS

(71) Applicant: CHI HSIANG OPTICS CO., LTD., Hsinchu County (TW)

(72) Inventor: Po Hung Yao, Hsinchu (TW)

(73) Assignee: CHI HSIANG OPTICS CO., LTD., Hsinchu County (TW)

( * ) Notice: Subject to any disclaimer, the term of this patent is extended or adjusted under 35 U.S.C. 154(b) by 0 days.

(21) Appl. No.: 15/996,957

(22) Filed: Jun. 4, 2018

(65) Prior Publication Data

US 2018/0348897 A1 Dec. 6, 2018

Related U.S. Application Data

(60) Provisional application No. 62/515,110, filed on Jun. 5, 2017.

(51) Int. Cl.
| | |
|---|---|
| *G06F 3/0354* | (2013.01) |
| *G06F 3/03* | (2006.01) |
| *G06F 3/038* | (2013.01) |
| *G06F 3/041* | (2006.01) |
| *G06F 3/044* | (2006.01) |
| *G02B 5/30* | (2006.01) |
| *G06F 3/042* | (2006.01) |
| *G06K 9/22* | (2006.01) |
| *G06T 7/70* | (2017.01) |

(52) U.S. Cl.
CPC ......... *G06F 3/0317* (2013.01); *G02B 5/3083* (2013.01); *G06F 3/038* (2013.01); *G06F 3/0321* (2013.01); *G06F 3/03542* (2013.01); *G06F 3/03545* (2013.01); *G06F 3/044* (2013.01); *G06F 3/0416* (2013.01); *G06F 3/0421* (2013.01); *G06F 2203/0384* (2013.01); *G06F 2203/04105* (2013.01); *G06F 2203/04106* (2013.01); *G06K 9/222* (2013.01); *G06T 7/70* (2017.01); *G06T 2207/10048* (2013.01)

(58) Field of Classification Search
CPC ....... G06F 2203/04109; G06F 3/03542; G06F 3/0386; G06F 3/037; G06K 9/32–3283
See application file for complete search history.

(56) References Cited

U.S. PATENT DOCUMENTS

| | | | |
|---|---|---|---|
| 6,441,362 B1* | 8/2002 | Ogawa | G06F 3/03545 178/19.04 |
| 2005/0110777 A1* | 5/2005 | Geaghan | G06F 3/03542 345/179 |
| 2013/0207937 A1* | 8/2013 | Lutian | G06F 3/042 345/175 |

* cited by examiner

*Primary Examiner* — Sanghyuk Park
(74) *Attorney, Agent, or Firm* — WPAT, P.C., Intellectual Property Attorneys; Anthony King

(57) ABSTRACT

A digital pen of the present disclosure includes a pen rod, an annular lens set provided in the pen rod, a pen core passing through the annular lens set and coaxial with the pen rod, a light source provided next to the pen core, an image receiver provided in the pen rod and operable to receive reflection light of light beams emitted from the light source, a microprocessor operable to control the light source and operable to receive a signal of the image receiver and perform analysis to acquire coordinate information of a position of the pen core, a wireless transmission module operable to transmit the coordinate information to an exterior, and a power source.

10 Claims, 2 Drawing Sheets

DIGITAL STYLUS

FIELD OF THE INVENTION

The invention relates to a digital writing pen, and more particularly to a digital pen having a pen core at a center axis of a pen rod thereof.

DESCRIPTION OF THE PRIOR ART

As technologies of touch screens and electromagnetic induction boards have gradually matured, there are various electronic digital pens that can easily write on various types of display devices. However, people are accustomed to write on conventional paper. Thus, numerous models of digital pens also having conventional pen cores (such as ink pens and pencils) have become commercially available. Further, for convenience of structural designs, these digital pens adopt an eccentric ballpoint design, that is, a pen core is deviated from the center axis of a pen rod. As such, although an image capturing module can obtain an image signal having a larger range, such eccentric ballpoint structure not only contradicts a writing habit of a user but also causes severe image discrepancy during image capturing. Thus, more complex image calibration algorithms are needed to the correct the image distortion in order to obtain the correct image signal to further correctly determine the handwriting trace, resulting in significant increase in costs of digital pens and difficulties in market promotion of digital pens.

Therefore, how to provide a solution that at the same time attends to both traditional habits of pen using of people and offers a more reliable function of digital pens is a critical issue to be resolved by the industry.

SUMMARY OF THE INVENTION

It is an object of the present disclosure to provide a digital pen having a pen core thereof located at a center axis of a pen rod thereof, thus conforming to not only conventional habits of pen using of people but also at the same time digitalizing handwriting traces.

It is another object of the present disclosure to provide a digital pen capable of performing image distortion calibration without needing complex image calibration algorithms, thereby reducing production costs and offering significant potential in market competitiveness.

To achieve the above objects, a digital pen of the present disclosure includes a pen rod, an annular lens set, a pen core, a light source, an image receiver, a microprocessor, a wireless transmission module and a power source. The pen rod has an imaginary center axis and an internal space. The annular lens set is provided in the internal space of the pen rod, and has an axial hole for the imaginary center axis to pass through. Two sides of the annular lens set are respectively an object side and an image side. The pen core is located on the imaginary center axis and protrudes outwards from the internal space of the pen rod to an exterior, passes through the axial hole of the annular lens set and has an outer end exposed outside the pen rod, wherein the outer end is located on the object side of the annular lens set. The light source is provided in the internal space of the pen rod and located next to the pen core, and is operable to emit light beams towards the outer end of the pen core. The image receiver is located in the internal space of the pen rod and on the image side of the annular lens set, and is operable to receive reflection light of the light beams emitted from the light source. The microprocessor is provided at the pen rod, and is operable to control the light source, receive a signal of the image receiver and perform analysis to acquire coordinate information of a position of the outer end of the pen core. The wireless module is operable to transmit the coordinate information to the exterior. The power source is provided at the pen rod and is electrically connected to the light source, the image receiver, the microprocessor and the wireless transmission module.

As such, the digital pen not only conforms traditional habits of pen using of people but also at the same time digitalizes handwriting traces without needing complex image calibration algorithms to correct an image distortion, thus reducing production costs and offering significant potential in market competitiveness.

DETAILED DESCRIPTION OF THE EMBODIMENTS

Figure 1:
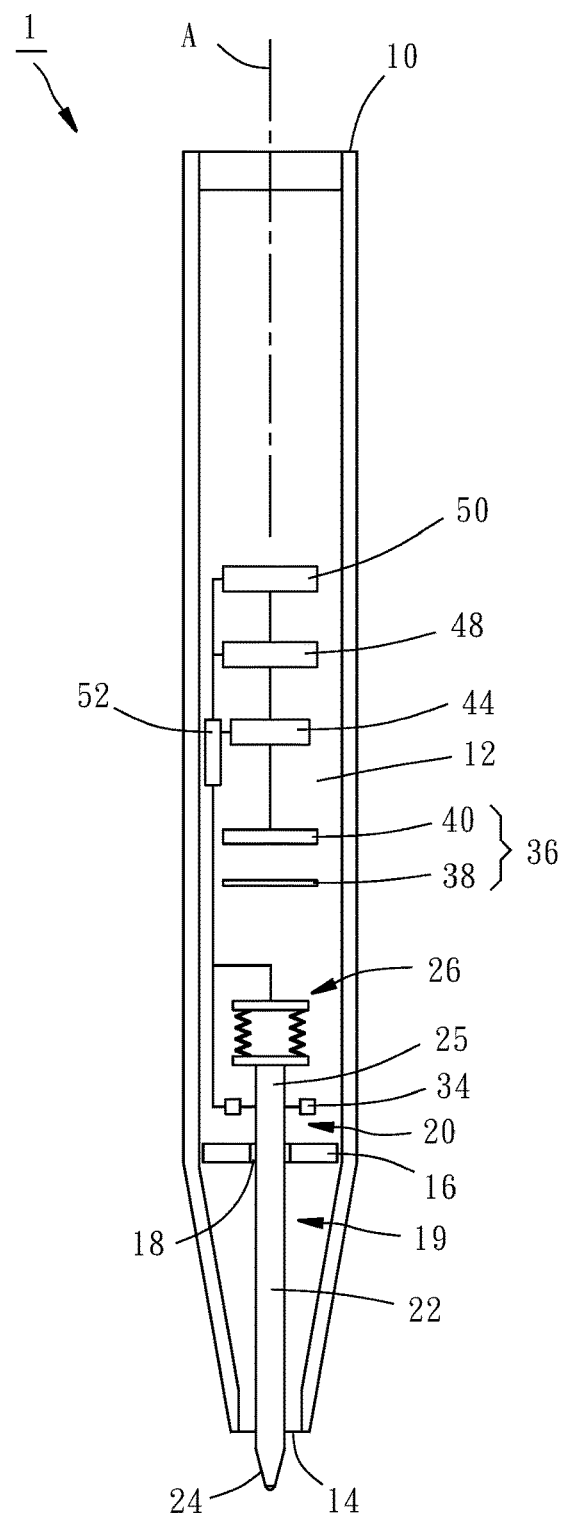
FIG. 1 is a schematic diagram of a digital pen according to a first preferred embodiment of the present disclosure.

Technical contents and features of the present disclosure are given in detail in two preferred embodiments with the accompanying drawings below. As shown in FIG. 1, a digital pen 1 according to a first preferred embodiment of the present disclosure includes a pen rod 10, an annular lens set 16, a pen core 22, a pressure sensor 26, two light sources 34, an image receiver 36, a memory 44, a microprocessor 48, a wireless transmission module 50 and a power source 52.

The pen rod 10 has an imaginary center axis A, an internal space 12, and an opening 14 in communication with the internal space 12 and an exterior.

The annular lens set 16 is provided in the internal space 12 of the pen rod 10, and includes one or more annular lenses, which focus light beams emitted from the light sources 34 to near an outer end 24 of the pen core 22 or form an image at the image receiver 36 for incident light beams from near the outer end 24 of the pen core 22. The annular lens set 16 (and each annular lens) has an axial hole 18 for the imaginary center axis A to pass through, and two sides of the annular lens set 16 are respectively an object side 19 and an image side 20.

The pen core 22 is provided in the internal space 12 of the pen rod 10, is located on the imaginary center axis A, and extends outwards from the internal space 12 of the pen rod 10 through the opening 14 to an exterior. Further, the pen core 22 passes through the axial hole 18 of annular lens set 16 and has the outer end 24 thereof protrude to the exterior of the pen rod 10, wherein the outer end 24 is located on the object side 19 of the annular lens set 16. The pen core 22 further has an inner end 25 located on the image side 20 of the annular lens set 16. The pen core 22 may be an ink pen core, a pencil pen core, or other types of pen cores.

Figure 2:
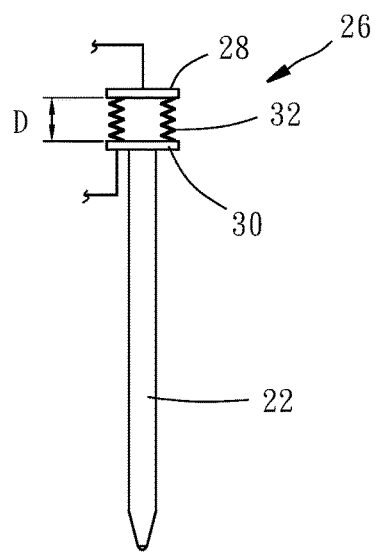
FIG. 2 is a schematic diagram of a pressure sensor of a digital pen according to the first preferred embodiment of the present disclosure.

The pressure sensor 26 is electrically connected to the microprocessor 48, is provided in the internal space 12 of the pen rod 10 and abutted against the inner end 25 of the pen core 22, and is for sensing a pressure from the pen core 22. The pressure sensor 26 may be designed in various aspects. In this embodiment, the pressure sensor 26 is a capacitor electrically connected to the power source 52. As shown in FIG. 2, the capacitor includes a fixed conductive plate 28, a mobile conductive plate 30 and an elastic member 32. The mobile conductive plate 30 and the fixed conductive plate 28 are reserved with a predetermined distance D therebetween, and the two are parallel to each other. The mobile conductive plate 30 is connected to one end of the flexible member 32, which has the other end thereof fixedly connected to the fixed conductive plate 28 of the pen rod 10. In other embodiments, the other end of the elastic member 32 may be fixedly connected to an inner wall of the pen rod 10. Thus, the elastic member 32 may apply on the mobile conductive plate 30 an elastic force towards the inner end 25 of the pen core 22, such that the mobile conductive plate 30 is maintained as abutting against the inner end 25 of the pen core 22. When the outer end 24 of the pen core 22 contacts paper or other writing surfaces, a counteracting force is transmitted to the mobile conductive plate 30 to change the distance between the mobile conductive plate 30 and the fixed conductive plate 28 to further change the value of capacitance, and a signal of this capacitance change may be transmitted to the microprocessor 48 to determine the magnitude of the counteracting force.

The light sources 34 are provided in the internal space 12 of the pen rod 10 and located next the pen core 22, and are operable to emit light beams towards the outer end 24 of the pen core 22. The light sources 34 are light-emitting diodes or other light-emitting elements, and the light beams are visible or invisible light (e.g., infrared or ultraviolet light), preferably invisible. In this embodiment, the light sources 34 are located on the image side 20 of the annular lens set 16, and emit light beams that can pass through the annular lens set 16 to focus near the outer end 24 of the pen core 22. In other embodiments, the light sources 34 may be provided on the object side 19 of the annular lens set 16.

The image receiver 36 is provided in the internal space 12 of the pen rod 10 and located on the image side 20 of the annular lens set 16, and is operable to receive reflection light of the light beams emitted from the light sources 34 and incident light entering from the proximity of the outer end 24 of the pen core 22. The image receiver 36 includes a color filter plate 38 and a light sensor 40. The color filter plate 38 is located between the annular lens set 16 and the light sensor 40, and is for filtering out light beams within a predetermined wavelength range from incident light beams, e.g., filtering out light bands easily causing noise in the light sensor 40 from the incident light and allowing only light beams having the same wavelength bands as the light beams emitted from the light sources 34 to pass through. The light sensor 40 may be a charge-coupled device (CCD), a complementary metal-oxide semiconductor (CMOS) or other devices capable of light sensing. It should be noted that, although the pressure sensor 26 and the two light sources 24 are present in front of the image receiver 36, sizes and configuration positions thereof can be adjusted, such that the annular lens set 16 is still capable of successfully forming an image at the image receiver 36.

The memory 44 is electrically connected to the light sensor 40 of the image sensor 36 and the microprocessor 48, and is for temporarily storing the signal from the image receiver 36 for the microprocessor 48 to analyze. However, the memory 44 may be selectively omitted to have the signal from the image receiver 36 to be directly transmitted to the microprocessor 48.

The microprocessor 48 is provided in the internal space 12 of the pen rod 10 or provided at the exterior of the pen rod 10, and is capable of controlling the turning on/off of the light sources 34 as well as receiving the signal from the image receiver 36 or the memory 44 and performing analysis to acquire coordinate information of the position of the outer end 24 of the pen core 22.

The wireless transmission module 50 is operable to receive the coordinate information acquired by the microprocessor 48, and transmit the same to other electronic devices such as a computer or a cell phone.

The power supply 52 is provided in the internal space 12 of the pen rod 10 or provided at the exterior of the pen rod 10, and is electrically connected to the pressure sensor 26, the light sources 34, the image receiver 26, the memory 44, the microprocessor 48 and the wireless transmission module 50.

When a user holds the digital pen to write on specific paper or surface, once the pen core 22 contacts the writing surface, a counteracting force reaches the pressure sensor 26 from the pen core 22, the signal of capacitance change of the pressure sensor 26 is received by the microprocessor 48, the microprocessor 48 controls the light sources 34 to emit light that is preferably invisible light to avoid interference on the user, the invisible light may be absorbed or reflected by a material of coordinate signal patterns formed by the writing surface, an absorbed or reflected image is generated, the image is formed through the annular lens set 16 and on the light sensor 40 having the frontend color filter plate 38, the light sensor 40 transmits the signal to the memory 44 for temporarily storage or directly transmits the signal to the microprocessor 48 for analysis, and the coordinate information of the handwriting trace is accordingly captured and transmitted to an exterior through the wireless transmission module 50.

In addition to capturing the coordinate signal patterns, the annular lens set 16 may further appropriately distribute illuminance of the light sources 34. The pressure sensor 26 can play the role of triggering the digital pen 1 to perform image capturing, and is further operable to sense a force applied on the pen core 22 during writing, so as to allow the microprocessor 48 to estimate writing details such as the force and thickness of pen strokes.

In the present disclosure, the pen core 22 of the digital pen 1 is located on the imaginary center axis A. Thus, the digital pen 1 not only conforms to traditional habits of pen using of people but also at the same time digitalizes handwriting traces without needing complex image calibration algorithms to perform image distortion correction, thus reducing production costs and offering significant potential in market competitiveness.

Figure 3:
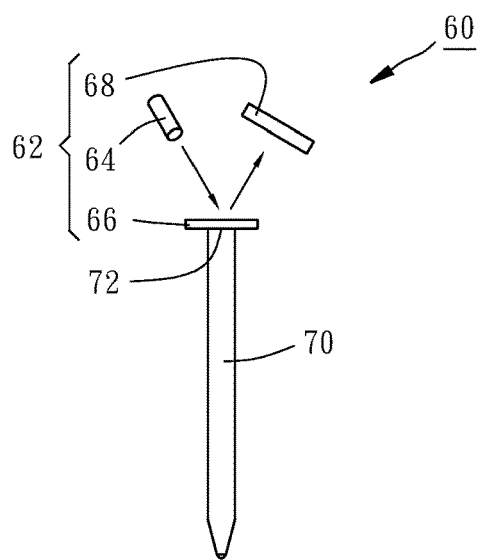
FIG. 3 is a schematic diagram of a pressure sensor of a digital pen according to a second preferred embodiment of the present disclosure.

On the basis of the spirit of the present disclosure, the design of the digital pen 1 may be modified, e.g., modifying the capacitive design of the pressure sensor 26 to a piezoelectric element or to an optical design. Referring to FIG. 3 showing a digital pen 60 according to a second preferred embodiment of the present disclosure, a pressure sensor 62 includes a laser light source 64, a contact piece 66 and an image sensor 68. The laser source 64 is electrically connected to a power source (not shown) and is operable to emit laser light towards the contact piece 66. The contact piece 66 is a grating plate and abuts against an inner end 72 of a pen core 70. The image sensor 68 is electrically connected to the power source and is operable to sense the laser light reflected from the contact piece 66. Accordingly, a counteracting force of the pen core 70 contacting a writing surface causes deformation of the contact piece 66 and changes a diffraction position of the laser light, such that the laser light is captured by the image sensor 68 and transmitted to a microprocessor (not shown) that then determines the magnitude of the counteracting force. In other embodiments, the contact piece 66 may be metal sheet, which deforms and accordingly changes a reflection angle of the laser light when receiving the counteracting force from the pen core 70.

Other modifications that can be made are, for example, omitting the pressure sensor, or determining by the microprocessor 48 whether the image received by the image receiver 36 is located near the focal point of the annular lens set 16 or determining whether to activate the capturing of coordinate information of handwriting traces. The above design variations that could be equivalently conceived of are covered within the scope of claims of present disclosure.

What is claimed is:

1. A digital pen, comprising:
    a pen rod, having an imaginary center axis and an internal space;
    an annular lens set, provided in the internal space of the pen rod, comprising an axial hole for the imaginary center axis to pass through, wherein two sides of the annular lens set are respectively an object side and an image side;
    a pen core, located on the imaginary center axis and extending outwards from the internal space of the pen rod to an exterior, the pen core passing through the axial hole of the annular lens set and comprising an outer end exposed outside the pen rod, wherein the outer end is located on the object side of the annular lens set;
    a light source, located in the internal space of the pen rod and located next to the pen core, operable to emit light beams towards the outer end of the pen core;
    an image receiver, provided in the internal space of the pen rod and located on the image side of the annular lens set, operable to receive reflection light of the light beams emitted from the light source;
    a microprocessor, provided at the pen rod, operable to control the light source and operable to receive a signal of the image receiver and performing analysis to acquire coordinate information of a position of the outer end of the pen core;
    a wireless transmission module, operable to transmit the coordinate information to the exterior; and
    a power supply, provided at the pen rod, electrically connected to the light source, the image receiver, the microprocessor and the wireless transmission module.

2. The digital pen according to claim 1, further comprising:
    a pressure sensor, electrically connected to the microprocessor, provided in the internal space of the pen rod and abutting against an inner end of the pen core, for sensing a pressure from the pen core.

3. The digital pen according to claim 2, wherein the pressure sensor is a capacitor electrically connected to the power source, the capacitor comprises a fixed conductive plate, a mobile conductive plate and an elastic member, a predetermined distance is reserved between the mobile conductive plate and the fixed conductive plate, the mobile conductive plate is connected to the elastic member, and the elastic member applies on the mobile conductive plate an elastic force towards the inner end of the pen core to cause the mobile conductive plate to be maintained as abutting against the inner end of the pen core.

4. The digital pen according to claim 2, wherein the pressure sensor comprises a laser light source, a contact piece and an image sensor, the laser light source is electrically connected to the power source and is operable to emit laser light towards the contact piece, the contact piece is abutted against the inner end of the pen core, and the image sensor is electrically connected to the power source and is operable to sense the laser light reflected from the contact piece.

5. The digital pen according to claim 4, wherein the contact piece is a grating plate.

6. The digital pen according to claim 1, wherein the light source is located on the object side or the image side of the annular lens set.

7. The digital pen according to claim 1, wherein the light source is a light-emitting diode emitting invisible light.

8. The digital pen according to claim 1, wherein the image receiver comprises a color filter plate and a light sensor, and the color filter plate is located between the annular lens set and the light sensor and is for filtering out light beams within a predetermine wavelength range from incident light beams.

9. The digital pen according to claim 1, further comprising:
    a memory, electrically connected to the image receiver and the microprocessor, for temporarily storing a signal of the image receiver for the microprocessor to analyze.

10. The digital pen according to claim 1, wherein the annular lens set comprises one or more annular lenses.

* * * * *